April 28, 1931.　　P. K. DEVERS　　1,803,175
ELECTRIC ARC DEVICE
Filed June 6, 1928
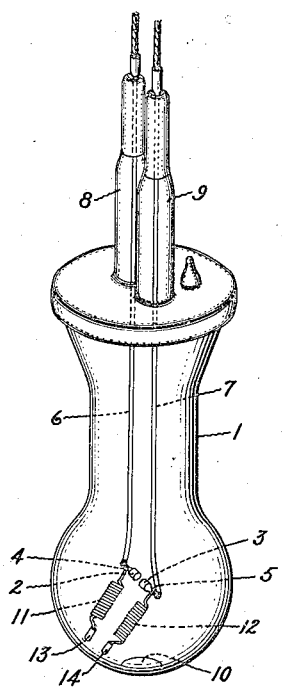
CONTAINS BORON NITRIDE
Inventor:
Philip K. Devers,
by Charles E. Tullar
His Attorney.

Patented Apr. 28, 1931

1,803,175

UNITED STATES PATENT OFFICE

PHILIP K. DEVERS, OF LYNN, MASSACHUSETTS, ASSIGNOR TO GENERAL ELECTRIC COMPANY, A CORPORATION OF NEW YORK

ELECTRIC-ARC DEVICE

Application filed June 6, 1928. Serial No. 283,365.

The present invention relates to electric discharge devices which are provided with means for operating an electric arc in a gas or vapor and its object is to improve the efficiency and life of such device. My invention is particularly applicable to devices for generating ultraviolet rays.

In devices of the character described in my prior Patent No. 1,310,067, granted July 15, 1919, an electrical arc is operated between electrodes of refractory material in an atmosphere of a gas or vapor. During the operation of such devices a gradual evaporation or disintegration of the electrodes occurs accompanied by the deposition of the vaporized material as a thin film upon the inside surface of the enclosing bulb. This reduces the light emission and lowers the efficiency of the device.

This disintegrating action is enhanced by the evolution of minute amounts of water vapor from the bulb or other part of the device during its operation. As is well known, water vapor becomes associated in such a way with glass silica or other vitreous material, that it is practically impossible to entirely remove it even if the material is subjected to a high temperature in a vacuum. Minute amounts of water vapor chemically react with incandescent metal, particularly so in the presence of an electric arc, thereby forming compounds which become dissociated when in contact with solid bodies, such as the wall of the envelope. Even when the water vapor is present in extremely minute amounts, the cyclic nature of the reaction causes a transfer of the material from the electrodes to the walls of the envelope.

In accordance with my invention a minute amount of a relatively stable, refractory nitride, such, for example, as boron nitride, zirconium nitride or titanium nitride is used in the device to reduce the deposition of electrode material upon the walls of the envelope to a very substantial degree. I, at present, prefer to use boron nitride.

I have shown in the accompanying drawing in perspective an arc device in which my invention may be embodied.

Referring to the drawing, the device comprises an elongated envelope 1 which preferably consists of fused silica, but which also may consist of a suitable high melting glass. In the bulbous enlargement at the lower end of the envelope are located electrodes 2, 3, supported upon stems 4, 5, which are in turn affixed to the ends of supporting wires or leads 6, 7. The latter are sealed in the wall of the envelope as indicated. When the envelope consists of fused silica a graded seal is employed, that is, the composition is caused to vary gradually or by steps from the silica of the envelope to a glass zone which will form a permanent gas-tight seal with the metal of the leading-in wires. For example, when the material of the leading-in wires consists of tungsten the composition of the seals 8, 9 is graded from silica to a glass such as Corning G702P glass into which tungsten may be readily sealed.

The envelope 1 also contains a small quantity of mercury 10 and preferably also is charged with an inert gas at a partial atmospheric pressure. For example, argon, or other rare gas, may be present at a pressure of about 25 c. m. of mercury. Attached to the electrode stems 3, 4 are helices 11, 12 also consisting of refractory material, such as tungsten, terminating at the ends in small buttons or electrodes 13, 14.

The function of these helices, which extend at an angle to the current-conveying leads 6, 7 is to start an arc in cooperation with the globule of mercury. When the lamp is tilted to cause the mercury to bridge the gap between the electrodes 13, 14 and then is tilted back to its original position, an arc is started between the electrodes 2, 3, either immediately or by transfer to the electrodes 2, 3 from the electrodes 13, 14 or adjacent parts. The heating effect of the arc between the main electrodes 2, 3 ordinarily vaporizes sufficient mercury to cause the electrodes to be surrounded by and the arc to operate in mercury vapor.

The device also contains a small quantity, say a few tenths of a milligram, of loose powdered boron nitride or other suitable nitride which, when decomposed by water vapor, will form a light colored or transparent oxide. During the operation of the arc any trace of water vapor which may be given off by the envelope, reacts with boron nitride forming boric anhydride or boric acid and setting free minute quantities of nitrogen and hydrogen.

Also a very thin film of boron nitride is caused to be deposited upon the inner surface of the envelope so that any electrode material which is vaporized is separated from the envelope by this very thin film of loosely adherent material. The particles of boron nitride also exert a mechanical scouring or cleaning effect upon any electrode material which loosely adheres to the envelope.

The effect of the nitride, both by its chemical and physical action, is to reduce the blackening of the walls of the bulb to such an extent that the useful life of the device is materially lengthened.

What I claim as new and desire to secure by Letters Patent of the United States is:

1. An electrical discharge device comprising the combination of an envelope, arc-supporting electrodes therein, a charge of gas, or vapor, and a quantity of loose powdered boron nitride.

2. An electrical discharge device comprising the combination of a vitreous envelope, arc-supporting electrodes therein, means for furnishing mercury vapor at substantial pressure, and a quantity of loose powdered boron nitride.

3. An electrical discharge device comprising the combination of an envelope of vitreous material, a charge of inert gas, a quantity of mercury, arc-supporting electrodes of tungsten and a quantity of loose powdered boron nitride.

4. An electric arc device comprising an elongated, sealed envelope of vitreous silica, a charge of inert gas at substantial pressure, arc-supporting electrodes of refractory metal and about a fraction of a milligram of loose, powdered boron nitride.

5. An electric lamp comprising a sealed transparent envelope, electrodes of tungsten therein, a charge of rare gas at a pressure of about 25 c. m. of mercury, a quantity of mercury and a fraction of a milligram of loose, powdered boron nitride.

In witness whereof, I have hereunto set my hand this 2nd day of June, 1928.

PHILIP K. DEVERS.